(12) United States Patent
Sambhwani et al.

(10) Patent No.: US 12,537,555 B2
(45) Date of Patent: Jan. 27, 2026

(54) SYSTEMS AND METHODS FOR CONFIGURING TRANSMISSION POWER LEVEL BASED ON BODY PROXIMITY

(71) Applicant: Apple Inc., Cupertino, CA (US)

(72) Inventors: Sharad Sambhwani, San Diego, CA (US); Huaning Niu, San Jose, CA (US); Xiang Chen, Campbell, CA (US); Yang Tang, San Jose, CA (US); Laxminarayana Pillutla, San Diego, CA (US); Dirk Nickisch, Oberpframmern (DE)

(73) Assignee: Apple Inc., Cupertino, CA (US)

( * ) Notice: Subject to any disclaimer, the term of this patent is extended or adjusted under 35 U.S.C. 154(b) by 582 days.

(21) Appl. No.: 17/747,525

(22) Filed: May 18, 2022

(65) Prior Publication Data

US 2023/0132977 A1    May 4, 2023

Related U.S. Application Data (60) Provisional application No. 63/272,807, filed on Oct. 28, 2021.

(51) Int. Cl.
*H04B 1/3827*    (2015.01)
*H04W 52/38*    (2009.01)

(52) U.S. Cl.
CPC .......... *H04B 1/3838* (2013.01); *H04W 52/38* (2013.01)

(58) Field of Classification Search
None
See application file for complete search history.

(56) References Cited

U.S. PATENT DOCUMENTS

| | | | | |
|---|---|---|---|---|
| 6,894,639 B1 * | 5/2005 | Katz | ................... | G06F 18/2135 |
| | | | | 706/15 |
| 10,447,413 B1 * | 10/2019 | Nadakuduti | ........... | H04B 17/18 |

(Continued)

FOREIGN PATENT DOCUMENTS

| | | | | |
|---|---|---|---|---|
| CN | 112534725 A | 3/2021 | | |
| KR | 20160135238 A | * 11/2016 | ............. | G01S 7/032 |
| WO | 2022073204 A1 | 4/2022 | | |

OTHER PUBLICATIONS

Apple; "UL gaps for Tx Power Management"; 3GPP Draft, R4-2117296, 3rd Generation Partnership Project (3GPP), Mobile Competence Centre, France; vol. RAN WG4, No. Electronic Meeting; Nov. 1, 2021-Nov. 12, 2021, Oct. 22, 2021 (XP052061725) [retrieved from internet https://ftp.3gpp.org/tsg_ran/WG4_Radio/TSGR4_101-e/Docs/R4-2117296.zip R4-2117296 FR2 RF UL gap.docx—retrieved on Oct. 22, 2021].

(Continued)

*Primary Examiner* — Gennadiy Tsvey
(74) *Attorney, Agent, or Firm* — FLETCHER YODER PC (57) ABSTRACT

A first transmission power level based on a radio frequency exposure limit and a second transmission power level based on the first transmission power level and a probability of detection of a body by a body proximity sensor are determined, where it is ensured that an average usage of the first and second transmission power levels over time does not exceed the transmission power limit, determined based on radio frequency exposure limits. A transmission power gain is determined based on a difference between the first and second transmission power level based on the probability of detection, and a false alarm rate of the body by the body proximity sensor. The transmission power gain may be used as a performance indicator to select from multiple first and second transmission power gains. First and second trans- (Continued)

mission power gains corresponding to the selected transmission power gain may be stored and applied during transmission.

18 Claims, 6 Drawing Sheets

(56) References Cited

U.S. PATENT DOCUMENTS

| | | | | |
|---|---|---|---|---|
| 11,200,786 | B1* | 12/2021 | Madden | G08B 13/1672 |
| 2012/0146803 | A1* | 6/2012 | Gear | H04W 76/14 |
| | | | | 340/686.6 |
| 2014/0307570 | A1* | 10/2014 | Hong | H04B 1/3838 |
| | | | | 370/252 |
| 2014/0339905 | A1* | 11/2014 | Moritsuka | B60L 53/36 |
| | | | | 307/104 |
| 2014/0370929 | A1 | 12/2014 | Khawand et al. | |
| 2015/0015477 | A1* | 1/2015 | Hughes | G06F 3/038 |
| | | | | 345/156 |
| 2015/0091753 | A1* | 4/2015 | Gogliettino | G01S 19/27 |
| | | | | 342/357.66 |
| 2015/0382307 | A1* | 12/2015 | Harper | H04B 7/022 |
| | | | | 455/127.1 |
| 2016/0164563 | A1* | 6/2016 | Khawand | H04W 52/221 |
| | | | | 455/127.2 |
| 2016/0365886 | A1* | 12/2016 | Prendergast | H04W 52/18 |
| 2016/0366654 | A1* | 12/2016 | Dervisoglu | H04W 52/285 |
| 2018/0069295 | A1* | 3/2018 | Han | H01Q 9/42 |
| 2018/0131449 | A1* | 5/2018 | Kare | G01S 17/89 |
| 2018/0160377 | A1* | 6/2018 | Abramsky | H04W 52/283 |
| 2018/0287651 | A1* | 10/2018 | Fernando | H04B 7/0617 |
| 2019/0074730 | A1* | 3/2019 | Shahsavari | G01R 27/2688 |
| 2019/0353750 | A1* | 11/2019 | Rimini | H04B 1/3838 |
| 2020/0044612 | A1 | 2/2020 | Bologna et al. | |
| 2020/0229102 | A1* | 7/2020 | Gubeskys | H04W 52/146 |
| 2020/0303041 | A1* | 9/2020 | Narayanan | G16H 50/20 |
| 2020/0404598 | A1* | 12/2020 | Landis | H04W 52/367 |
| 2021/0239819 | A1* | 8/2021 | Mattsson | G01S 13/04 |

OTHER PUBLICATIONS

Extended European Search Report for European Patent Application No. 22194962.1 dated Mar. 23, 2023; 10 pgs.
3GPP tsg_ranwg4_radio, Apple , R4 2117296, FR2 RF UL gap, Section 2, Oct. 23, 2021; 10 pgs.
3GPP tsg_ranwg4_radio, Qualcomm Incorporated, R4 1904619, SAR mitigation for PC2 FDD TDD EN DC in FR1, Apr. 2, 2019; 3 pgs.

* cited by examiner

SYSTEMS AND METHODS FOR CONFIGURING TRANSMISSION POWER LEVEL BASED ON BODY PROXIMITY

CROSS-REFERENCE TO RELATED APPLICATIONS

This application claims priority to U.S. Provisional Application No. 63/272,807, filed Oct. 28, 2021, entitled "Systems and Methods for Configuring Transmission Power Level Based on Body Proximity," the disclosure of which is incorporated by reference in its entirety for all purposes.

BACKGROUND

The present disclosure relates generally to wireless communication, and more specifically to transmission power of user equipment.

To transmit signals over a greater distance and/or with less data loss, user equipment may use greater transmission power. However, to reduce an effect of radio frequency exposure on a user, transmission power may be limited.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, one or more non-transitory, tangible, computer-readable media stores instructions that cause processing circuitry to receive a probability of detection of a body by a body proximity sensor, receive a first transmission power level based on a radio frequency exposure limit, and determine a second transmission power level based on the first transmission power level and the probability of detection of the body by the body proximity sensor. The instructions also cause the processing circuitry to cause a transmitter to transmit at the first transmission power level based on detecting the body by the body proximity sensor, and cause the transmitter to transmit at the second transmission power level based on not detecting the body by the body proximity sensor.

In another embodiment, a method includes receiving, at processing circuitry, a probability of detection of a body by a body proximity sensor. The method also includes receiving, at the processing circuitry, a first transmission power level based on a radio frequency exposure limit. The method further includes determining, at the processing circuitry, a second transmission power level based on the first transmission power level and the probability of detection of the body by the body proximity sensor. The method also includes storing, in a memory or storage device, the first transmission power level and the second transmission power level.

In yet another embodiment, user equipment includes a body proximity sensor that detects a body with a probability of detection, one or more antennas, and a transmitter that transmits radio frequency signals via the one or more antennas at a first transmission power level based on the body proximity sensor detecting the body and the probability of detection, and at a second transmission power level based on the body proximity sensor not detecting the body and the probability of detection.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on.

Wireless devices, such as user equipment, may maintain their radio frequency (RF) exposure within limits defined by regulatory bodies, such as the Federal Communications Commission (FCC). The RF exposure caused to a human body or part of a human body depends on a distance between a transmitter of the user equipment and the human target.

Figure 1:
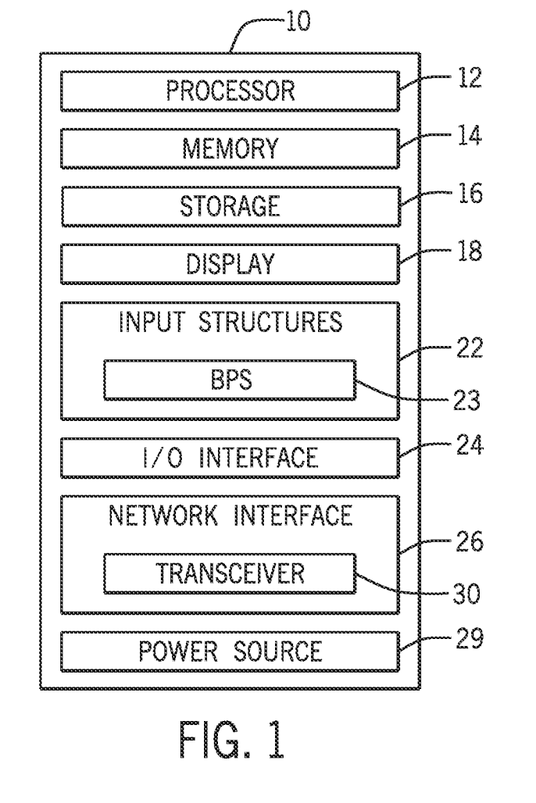
FIG. 1 is a block diagram of user equipment, according to embodiments of the present disclosure.

FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). As illustrated, the input structures 22 may include a body proximity sensor (BPS) 23. The BPS 23 may determine if a body, such as human target or user, is within close proximity (e.g., within a threshold range, such as within one or more millimeters (mm), including within 1 mm, within 2 mm, within 3 mm, within 5 mm, within 10 mm, within 20 mm, and so on) of an antenna of the user equipment 10, or if no human target is present in close proximity. In additional or alternative embodiments, the BPS 23 may determine if other objects (e.g., obstructions, trees, rocks, buildings, and so on) or non-human targets (e.g., dogs, cats, horses, livestock, and so on) are within close proximity of the antenna, or if no other object or non-human target is within close proximity of the antenna.

The I/O interface 24 may enable the user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the user equipment 10 may include any suitable source of power, such as a rechargeable lithium polymer (Li-poly) battery and/or an alternating current (AC) power converter.

Figure 2:
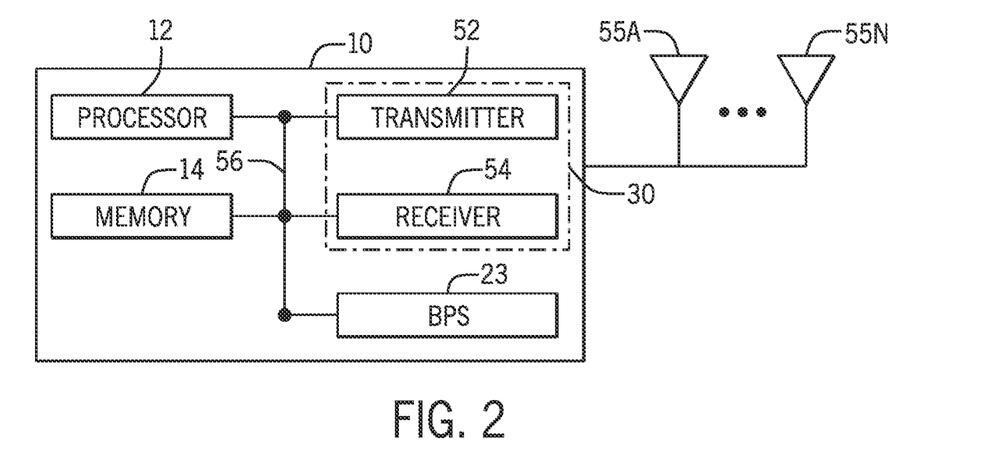
FIG. 2 is a schematic diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the BPS 23, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
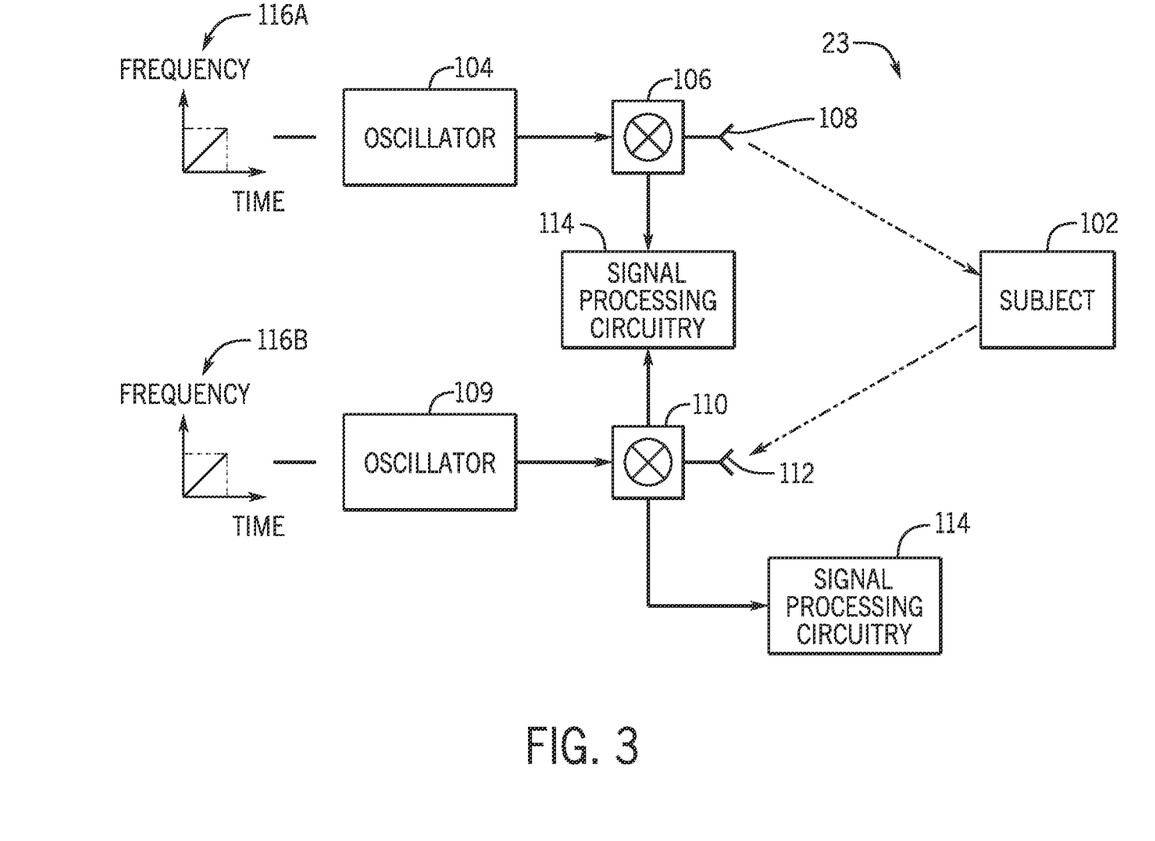
FIG. 3 is a schematic diagram of a body proximity sensor of the user equipment of FIG. 1, according to embodiments of the present disclosure.

FIG. 3 is a schematic diagram of the BPS 23, according to embodiments of the present disclosure. The BPS 23 may determine a direction and/or distance between the user equipment 10 and a subject 102 (e.g., a human target, a user). The BPS 23 may facilitate meeting a maximum permissible exposure (MPE) of RF waves as defined for the user equipment 10. In particular, the BPS 23 may determine the direction and/or distance to the subject 102 within a range of the user equipment 10, which may be used to determine an amount of RF exposure to the subject 102 from the user equipment 10. The BPS 23 may include a first oscillator 104, a first interface 106, a first antenna 108, a second oscillator 109, a second interface 110, a second antenna 112, and/or signal processing circuitry 114. In some embodiments, the first oscillator 104, the first interface 106, the first antenna 108, the second oscillator 109, the second interface 110, the second antenna 112, and/or the signal processing circuitry 114 may be implemented within the user equipment 10, and may be coupled to one or more other components within the user equipment 10. For example, in some embodiments, the first oscillator 104 and the second oscillator 109 may each comprise or share a local oscillator of the user equipment 10, the first and second antennas 108, 112 may be included in the antennas 55 as shown in FIG. 2, and/or the signal processing circuitry 114 may be part of the processor 12 as shown in FIG. 2.

In operation, the first oscillator 104 and/or the second oscillator 109 may each receive a signal output by another component of the user equipment 10 (as represented by the frequency graphs 116A, 116B), and may themselves output signals with frequencies defined by the signal received from the other component of the user equipment 10. For example, a voltage and/or current of the signal received from the other component may define a frequency of the signal output by the oscillators 104, 109. The oscillators 104, 109 may each output (either through generation of a signal or modification of a signal) the signal having the defined frequency. In some embodiments, the oscillators 104, 109 may share a single input signal (e.g., 116A or 116B).

The first interface 106 may receive the signal output by the first oscillator 104 and output a signal to be output by the first antenna 108 based on the signal received from the first oscillator 104. For example, the first interface 106 may receive the signal output by the first oscillator 104 and itself output a signal with the frequency of the signal output by the first oscillator 104. The signal output by the first interface 106 may be in a format to facilitate wireless transmission of the signal by the first antenna 108. In particular, in response to receiving the signal from the first interface 106, the antenna 108 may wirelessly transmit the signal into the area around the user equipment 10. In some embodiments, the signal transmitted by the antenna 108 may have a low power spectrum density and a wide bandwidth. The wireless transmission of the signal by the first antenna 108 may be part of a BPS operation for determining a direction and/or distance between the user equipment 10 and the subject 102.

A portion of the signal emitted by the first antenna 108 may encounter the subject 102. The portion of the signal that encounters the subject 102 may be reflected from the subject 102. Characteristics of the portion of the signal reflected back may differ from the signal emitted by the first antenna 108 due to encountering the subject 102. For example, the portion of the signal reflected back may have a lower amplitude than the signal emitted from the first antenna 108.

The second antenna 112 may receive the portion of the signal reflected back from the subject 102 and provide the portion of the signal to the second interface 110. The second interface 110 may output an electrical signal based on the portion of the signal received from the second antenna 112 for signal processing. The second interface 110 may receive the signal output by the second oscillator 109 and produce a signal based on the signal received from the second oscillator 109. For example, the second interface 110 may receive the signal output by the second oscillator 109 and output a signal with the frequency of the signal output by the second oscillator 109. The signal output by the second interface 110 based on the signal received from the second oscillator 109 may be equivalent to, or at least similar to, the signal output by the first interface 106 based on the signal received from the first oscillator 104.

The second interface 110 may provide the signal produced based on the reflected signal received by the second antenna 112 and the signal produced based on the output signal of the second oscillator 109 to the signal processing circuitry 114. The signal processing circuitry 114 may process the signal produced based on the reflected signal and the signal produced based on the output signal of the second oscillator 109 to determine a direction and/or distance between the user equipment 10 and the subject 102. For example, the signal processing circuitry 114 may include one or more filters, one or more analog-to-digital converters (ADCs), one or more fast Fourier transform (FFTs) circuits, and/or other circuitry to perform signal processing of the signals to determine the direction and/or distance between user equipment 10 and the subject 102.

Based on the determined direction and/or distance of the user equipment 10 from the subject 102, one or more operations of the user equipment 10 may be adjusted. For example, MPE limits may be defined for transmissions from the antenna 55 (e.g., based on the subject 102 being within close proximity to the user equipment 10). That is, based on the determined direction and/or distance of the user equipment 10 from the subject 102, or portion thereof, the user equipment 10 may modify certain operations from standard operation to meet the MPE limits. In some embodiments, if the distance between the user equipment 10 and the subject 102 is less than a threshold distance, operational characteristics of transmissions may be adjusted from standard values or settings. In some embodiments, the transmissions of the user equipment 10 adjusted from the standard transmission may be the transmissions emitted toward the subject 102. In particular, transmission power of the transmitter 52 may be reduced from standard transmission power levels to meet MPE limits.

Figure 4:
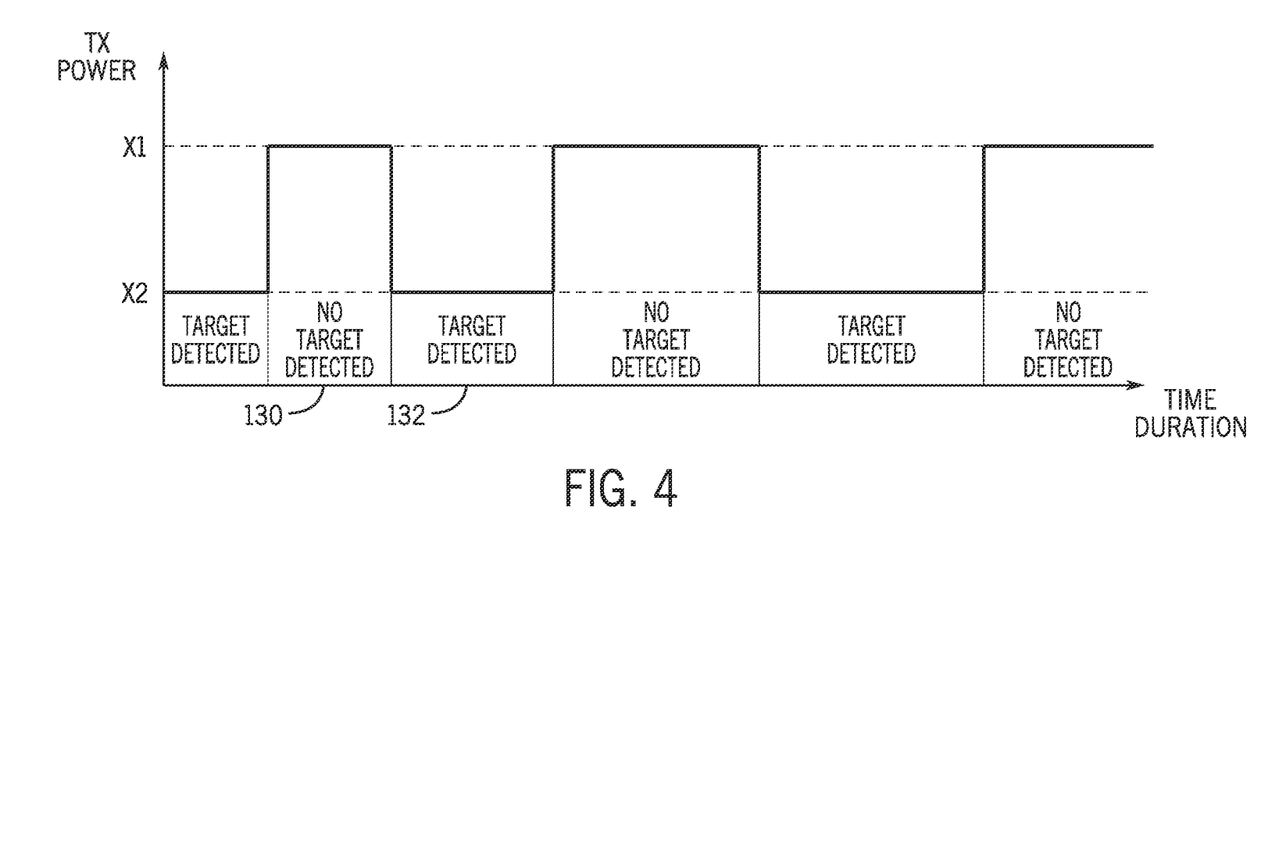
FIG. 4 is a timing diagram of configuring transmission power based on body proximity sensor detection, according to embodiments of the present disclosure.

Based on detection of a human target within a close proximity (e.g., within a threshold range, such as within one or more millimeters (mm), including within 1 mm, within 2 mm, within 3 mm, within 5 mm, within 10 mm, within 20 mm, and so on) of the antenna 55 by the BPS 23, the user equipment 10 may adjust transmission power of the transmitter 52 to ensure RF exposure compliance. FIG. 4 is a timing diagram of configuring transmission power based on BPS 23 detection, according to embodiments of the present disclosure. As illustrated, when no human target is detected by the BPS 23 or a human target is not in close proximity to the antenna 55, such as in time period 130, the user equipment 10 may transmit with a high or higher transmission power level (e.g., a transmission power level of X1). That is, because a human target is beyond an RF exposure critical or threshold distance, transmitting with the high transmission power level of X1 may not cause any human target to exceed the RF exposure limit. The user equipment 10 may operate using the high transmission power level X1 until a next BPS 23 detection. The high transmission power level X1 may be at or above a limit defined by a regulatory body, such as the Federal Communications Commission (FCC). For example, X1 may equal 21 decibel-milliwatts (dBm) or greater, 22 dBm or greater, 23 dBm or greater, 26 dBm or greater, 28 dBm or greater, and so on.

When the BPS 23 detects a human target in close proximity to the antenna 55, such as in time period 132, because the high transmission power level X1 may cause a high amount of RF exposure to the human target, the user equipment 10 may apply a low or lower transmission power level (e.g., a reduced transmission power level of X2) to maintain RF exposure within regulatory limits. The low transmission power level X2 may be at or below a limit defined by a regulatory body, such as the Federal Communications Commission (FCC). For example, X2 may equal 21 dBm or less, 20 dBm or less, 19 dBm or less, 18 dBm or less, and so on. The user equipment 10 may operate using the low transmission power level X2 until a next BPS 23 detection. In the case where the BPS 23 may be deactivated or turned off, the user equipment 10 may also operate using the low transmission power level X2.

However, the BPS 23 may not have 100% accuracy, and may, at times, detect the presence of a subject 102 when there is no subject 102 present (e.g., a false alarm), or not detect the presence of a subject 102 when there a subject 102 is present (e.g., a missed detection). The probability of detection or rate of correctly detecting a human target (e.g., the subject 102) when it is in close proximity to the BPS 23 may be characterized as a Probability of Detection (Pa), which may be calculated using Equation 1 below.

$$P_d = \frac{\text{Number of correct } BPS \text{ target detections}}{\text{Overall number of } BPS \text{ detection attempts}} \quad \text{(Equation 1)}$$

A False Alarm Rate (FAR) applies for scenarios where no human target is present, and may be calculated using Equation 2 below:

$$FAR = \frac{\text{Number of incorrect } BPS \text{ target detections}}{\text{Overall number of } BPS \text{ detection attempts}}$$

(Equation 2)

Under at least some regulations, RF exposure limits may not only be enforced for a point in time, but also over a time domain. That is, the user equipment 10 may ensure that average RF exposure over a range of time also meets the RF exposure limits. As discussed above, if the BPS 23 does not detect a human target within close proximity of the antenna 55, the user equipment 10 may cause the transmitter 52 to transmit using the high transmission power level of X1. However, in the case of a missed detection (e.g., where there is a human target within close proximity of the antenna 55 but the BPS 23 does not detect the human target), the human target may be exposed to the high transmission power level of X1, which may exceed the regulatory RF exposure limits. On the other hand, each correct BPS 23 detection results in the transmission power level set to the low transmission power level of X2, which exposes the human target to instantaneous low RF exposure below the regulatory limits. If the human target is exposed to a sufficient number of high power transmissions due to BPS 23 missed detections over a time period, then, over that time period, the human target may be exposed to an RF exposure (e.g., an average RF exposure) that exceeds the regulatory limits.

The presently disclosed embodiments determine and apply transmission power levels (e.g., X1 and X2) based on the BPS Probability of Detection (Pa), while considering the regulatory RF exposure limits. X1 and X2 may be determined or optimized to achieve a maximum average transmission power gain (e.g., over a time period) when operating with the BPS 23 while ensuring that the maximum RF exposure caused during the entire transmission does not exceed regulatory limits.

Figure 5:
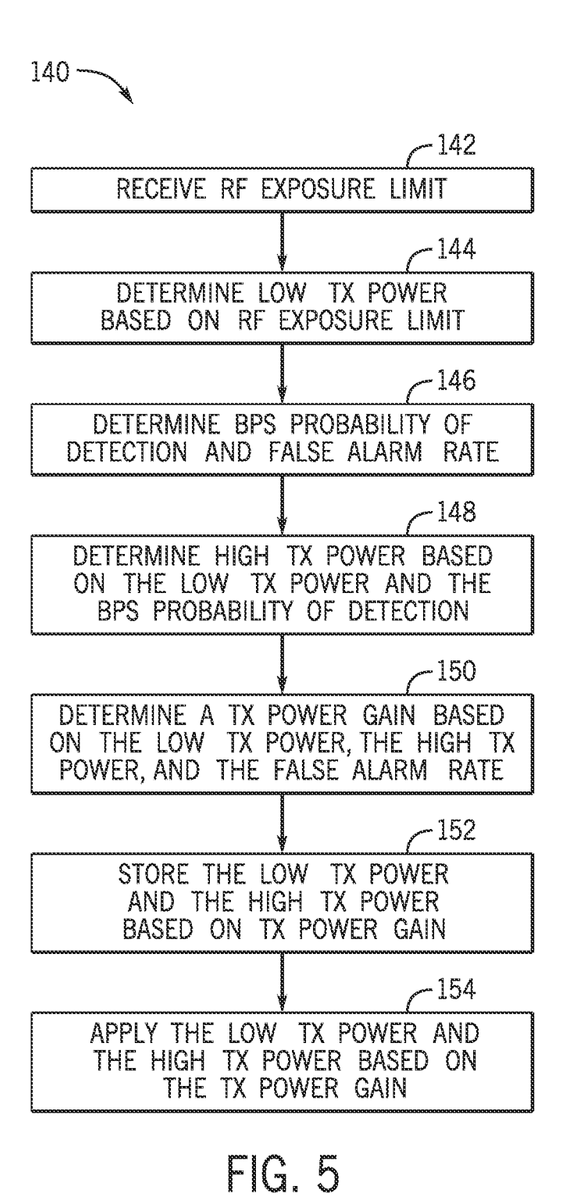
FIG. 5 is a flowchart of a method for determining and applying transmission power levels based on a Probability of Detection, while ensuring compliance with regulatory radio frequency (RF) exposure limits, according to embodiments of the present disclosure.

FIG. 5 is a flowchart of a method 140 for determining and applying transmission power levels based on the Probability of Detection (Pa), while ensuring compliance with regulatory RF exposure limits, according to embodiments of the present disclosure. Any suitable device (e.g., a controller) that may control components of the user equipment 10, such as the processor 12, may perform the method 140. In some embodiments, the method 140 may be implemented by executing instructions stored in a tangible, non-transitory, computer-readable medium, such as the memory 14 or storage 16, using the processor 12. For example, the method 140 may be performed at least in part by one or more software components, such as an operating system of the user equipment 10, one or more software applications of the user equipment 10, and the like. While the method 140 is described using steps in a specific sequence, it should be understood that the present disclosure contemplates that the described steps may be performed in different sequences than the sequence illustrated, and certain described steps may be skipped or not performed altogether.

In process block 142, the processor 12 receives the RF exposure limit. For example, the RF exposure limit may be set by a regulatory entity, such as the FCC. In some embodiments, the RF exposure limit may be received from a base station or communication network, and/or may vary from geographical region to geographical region. In process block 144, the processor 12 determines the low transmission (TX) power level X2 relative to the RF exposure limit. In some embodiments, the processor 12 may set the low transmission power level X2 to (or cause the antenna 55 to emit) the RF exposure limit. In additional or alternative embodiments, an exposure buffer or margin may be implemented when defining the low transmission power level X2. That is, the low transmission power level X2 may be defined by a sum of the RF exposure limit and the exposure buffer. This exposure margin may correspond to a transmission power backoff to be applied relative to the RF exposure limit to ensure regulatory compliance. The transmission power backoff may be fixed, and may include 1 decibel-milliwatts (dBm) or less, 1.5 dBm or less, 2 dBm or less, 5 dBm or less, and so on. In particular, the transmission power backoff may include any suitable value that compensates for factors that may change the transmission power (e.g., and thus cause the transmission power to exceed the RF exposure limit), such as RF impairments and/or transmission power changes due to temperature variations, among others.

In process block 146, the processor 12 determines the BPS Probability of Detection and False Alarm Rate. This may be performed during, for example, a manufacturing or testing phase of the user equipment 10 (e.g., prior to shipping or delivering the user equipment 10 to a customer or consumer). In particular, a human target or a phantom (e.g., an object that simulates a human target) may be placed in close proximity (e.g., within a threshold range, such as within one or more millimeters (mm), including within 1 mm, within 2 mm, within 3 mm, within 5 mm, within 10 mm, within 20 mm, and so on) to the antenna 55 of the user equipment 10. The processor 12 may operate the BPS 23 to detect the target, and for each BPS detection attempt, the processor 12 determines whether the target was detected or not. Based on the overall number of detection attempts and the number of correct detections, the processor 12 may determine the Probability of Detection (e.g., using Equation 1 above).

The processor 12 may also determine a False Alarm Rate of the BPS 23. Again, the processor 12 may operate the BPS 23 (e.g., this time with no human target or phantom in close proximity of the antenna 55), and for each BPS detection attempt, the processor 12 determines whether the target was detected (e.g., a False Alarm) or not (e.g., a Correct Detection result). Based on the overall number of detection attempts and the number of False Alarms, the processor 12 may determine the False Alarm rate (e.g., using Equation 1 above).

In process block 148, the processor 12 determines the high transmission power level X1 based on the Probability of Detection. In particular, the processor 12 may have determined the BPS Probability of Detection in process block 146 and may have determined the low transmission power level X2 relative to the RF exposure limit in process block 144. The processor 12 may then determine a transmission power level difference between the high transmission power level and the low transmission power level (e.g., X1-X2) that simulates the RF exposure for the BPS Probability of Detection based on these inputs, without exceeding the RF exposure limit. That is, the processor 12 may determine the transmission power level difference X1-X2, and thus the high transmission power level X1, to ensure that the RF exposure limit is not exceeded (e.g., over time), while increasing or maximizing the transmission power difference (e.g., to increase or maximize the high transmission power level X1 to ensure superior communication performance).

For example, the processor 12 may determine the transmission power difference by assuming that a human target is in close proximity 100% of the time for a given time period (e.g., a regulatory averaging period). The regulatory averaging period may be any suitable time period to measure RF exposure values, such as 1 second or less, 4 seconds or less, 10 seconds or less, 30 seconds or less, and so on. The processor 12 may then average the low transmission power level X2 for the time that the BPS 23 correctly detects a human target according to the BPS Probability of Detection and the high transmission power level X1 for the time that the BPS 23 misses detecting a human target according to the BPS Probability of Detection, and ensure that the average is within the RF exposure limit. The processor 12 may then determine the transmission power level difference X1-X2. For example, if the BPS Probability of Detection is 70%, the processor 12 may apply the low transmission power level X2 for 70% of the applicable time range, and apply the high transmission power level X1 for 30% of the applicable time range, and ensure that the average transmission power over the applicable time range is within the RF exposure limit. The processor 12 may then determine the transmission power level difference X1-X2.

In some cases, simulation may be performed for different values of the high transmission power level X1 to find a transmission power difference (e.g., an increased or maximum transmission power difference) that is still RF exposure compliant. For example, the simulation may include performing BPS 23 detection to generate target detection results at fixed intervals, and applying the Probability of Detection that was determined in process block 146. Based on the BPS detection result, the transmission power levels and/or RF exposure value are selected and recorded. In particular, if no target is detected, the high transmission power level X1 is selected and the corresponding RF exposure is stored for RF exposure time domain averaging. On the other hand, if a target is detected, the low transmission power level X2 is selected and the corresponding RF exposure is stored for RF exposure time domain averaging.

The RF exposure values recorded during the simulation may be set relative to RF exposure limit. For example, the low transmission power level X2 may have been determined relative to RF exposure limit, as discussed above. As such, for the low transmission power level X2, the RF exposure may be determined using Equation 3 below:

$$\text{Relative } RF \text{ Exposure } (X2) = 10^{\frac{RF \text{ Exposure limit } TX \text{ Power} - X2}{10}} \quad \text{(Equation 3)}$$

The high transmission power level X1 may have been determined per simulation run relative to the low transmission power level X2, where simulations were performed for different transmission power difference X1-X2 values, as discussed above. As such, for the high transmission power level X1, the RF exposure may be determined using Equation 4 below:

$$\text{Relative } RF \text{ Exposure } (X1) = \text{Relative } RF \text{ Exposure } (X2) \times 10^{\frac{X1-X2}{10}} \quad \text{(Equation 4)}$$

Based on the BPS detection-dependent RF exposure values determined through the simulation, the processor 12 may determine the time domain averaged RF exposure values (e.g., according to regulatory averaging periods). The processor 12 may determine a time domain RF exposure (e.g., a maximum RF exposure over time) for each combination of transmission power level difference X1-X2. The processor 12 may then determine a transmission power difference X1-X2 value (e.g., a maximum transmission power difference X1-X2 value) for which RF exposure is within regulatory limits. This determined maximum RF exposure compliant transmission power difference X1-X2 value defines a net transmission power gain for BPS operation when a human target is close by the antenna 55.

In process block 150, the processor 12 determines a transmission power gain based on the low transmission power, the high transmission power, and the false alarm rate. That is, the processor 12 may determine the transmission power gain that may be achieved due to BPS 23 operation over time. The processor 12 may determine the transmission power gain by applying the False Alarm Rate, which corresponds to False Alarms, where a human target is detected in close proximity to the antenna 55 when there is no actual human target in close proximity to the antenna 55. During these False Alarms, the transmitter 52 may use the low transmission power level X2 for transmission (e.g., instead of the proper high transmission power level X1). As such, False Alarms further decrease the average achievable transmission power gain.

Figure 6:
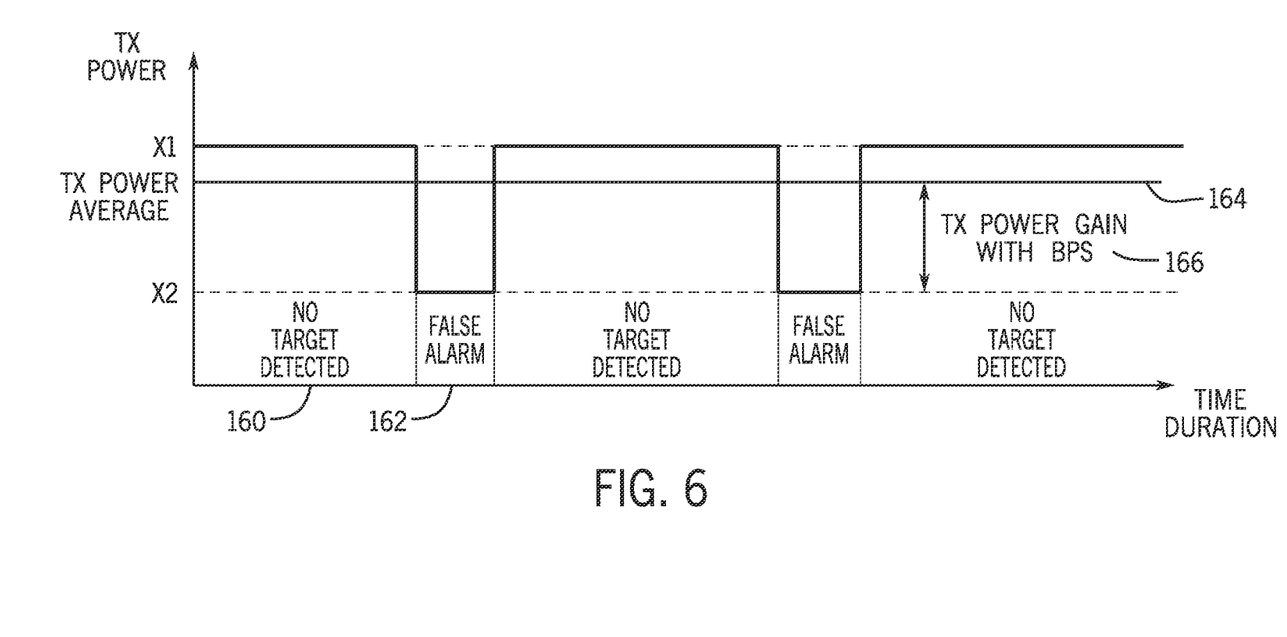
FIG. 6 is a timing diagram illustrating False Alarms decreasing an average transmission power gain, according to embodiments of the present disclosure.

FIG. 6 is a timing diagram illustrating False Alarms decreasing the average transmission power gain, according to embodiments of the present disclosure. As illustrated, the BPS 23 determines, for certain time periods 160, that there is no human target in close proximity to the antenna 55. During these time periods 160, the processor 12 causes the transmitter to use the high transmission power level X1 for transmission. However, for other time periods 162, the BPS 23 also mistakenly determines that there is a human present when there is not, resulting in a False Alarm. During these time periods 162, the processor 12 causes the transmitter to use the low transmission power level X2 for transmission. As such, the average transmission power 164 is decreased due to the False Alarms, and the average transmission power gain 166 (e.g., as based on or measured from the low transmission power level X2) is also decreased. The processor 12 may determine the average transmission power gain 166 using Equation 5 below, where b is the False Alarm Rate as determined in Equation 2 above:

$$\text{Achievable } TX \text{ Power gain with } BPS(\text{dB})=X1\times(1-b)+X2\times b \quad \text{(Equation 5)}$$

In process block 152, the processor 12 selects and/or stores the high transmission power level X1 and the low transmission power level X2 based on the average transmission power gain 166 and/or a rate of detection. In particular, the processor 12 may select a larger or maximum average transmission power gain 166, and store the high transmission power level X1 and the low transmission power level X2 corresponding to the larger or maximum average transmission power gain 166 (e.g., in the memory 14 and/or the storage 16). That is, the transmission power gain 166 may be used as a performance indicator of pairs of the high transmission power level X1 and the low transmission power level X2. In process block 154, the processor 12 applies the stored high transmission power X1 and the low transmission power level X2 during transmission based on a desired transmission power gain (e.g., a desired average transmission power gain 166). In particular, the processor 12 may apply the high transmission power X1 in response to the BPS 23 detecting there is no human target, and the low transmission power level X2 in response to the BPS 23 detecting there is a human target. In this manner, the method 140 enables the user equipment 10 to determine and apply transmission power levels based on the BPS 23 Probability of Detection, while ensuring compliance with regulatory RF exposure limits.

Figure 7:
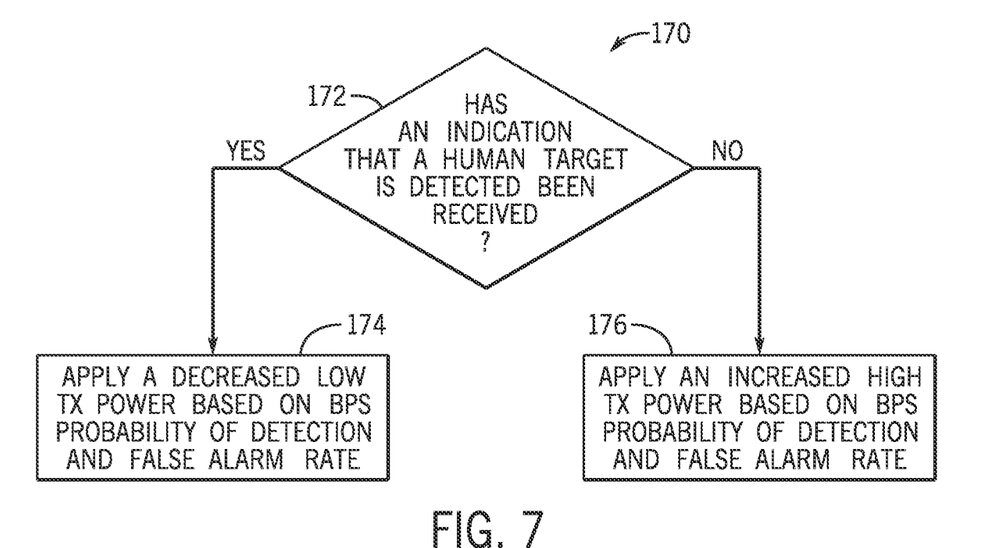
FIG. 7 is a flowchart of a method for determining and applying transmission power levels based on the Probability of Detection (Pa) and a presence of a human target as detected by the body proximity sensor of FIG. 3, while ensuring compliance with regulatory RF exposure limits, according to embodiments of the present disclosure.

In additional or alternative embodiments, rather than determining the low transmission power level X2 relative to the RF exposure limit as shown in process block 144, the processor 12 may determine the low transmission power level X2 based on other factors, in place of or in addition to the RF exposure limit. For example, the processor 12 may determine the low transmission power level X2 based on presence of a human target as detected by the BPS 23. FIG. 7 is a flowchart of a method 170 for determining and applying transmission power levels based on the Probability of Detection (Pa) and a presence of a human target as detected by the BPS 23, while ensuring compliance with regulatory RF exposure limits, according to embodiments of the present disclosure. Any suitable device (e.g., a controller) that may control components of the user equipment 10, such as the processor 12, may perform the method 170. In some embodiments, the method 170 may be implemented by executing instructions stored in a tangible, non-transitory, computer-readable medium, such as the memory 14 or storage 16, using the processor 12. For example, the method 170 may be performed at least in part by one or more software components, such as an operating system of the user equipment 10, one or more software applications of the user equipment 10, and the like. While the method 170 is described using steps in a specific sequence, it should be understood that the present disclosure contemplates that the described steps may be performed in different sequences than the sequence illustrated, and certain described steps may be skipped or not performed altogether.

In decision block 172, the processor 12 determines whether an indication has been received from the BPS 23 that a human target is detected. If so, then, in process block 174, the processor 12 applies a decreased low transmission power level X2 (e.g., beyond what is determined in process block 144 of FIG. 5) to account for missed detections. That is, because a human target is exposed to the high transmission power level X1 in the case of a missed detection, the processor 12 may decrease the low transmission power level X2 to drive the average transmission power over time down to compensate for the high transmission power level X1 exposure. The decreased low transmission power level X2 may be stored in the memory 14 and/or the storage 16, or the processor 12 may decrease the low transmission power level X2 that is stored in the memory 14 and/or the storage 16. It should be understood that the decreased low transmission power level X2 and/or the low transmission power level X2 that is decreased by the processor 12 may be determined using the method 140 shown in FIG. 5, which may be determined based on the BPS Probability of Detection and False Alarm Rate as described in the method 140.

If the processor 12 determines that an indication has not been received from the BPS 23 that a human target is detected, then, in process block 176, the processor 12 applies an increased high transmission power level X1 (e.g., beyond what is determined in process block 144 of FIG. 5) to compensate for the decreased low transmission power level X2 applied in process block 174. Indeed, in some embodiments, the processor 12 may set the high transmission power level X1 to meet the RF exposure limit, such that no exposure margin is applied. In additional or alternative embodiments, the processor 12 may apply a default high transmission power level X1 (e.g., that determined in process block 144 of FIG. 5). As with the decreased low transmission power level X2 applied in process block 174, the increased high transmission power level X1 may be stored in the memory 14 and/or the storage 16, or the processor 12 may decrease the default high transmission power level X1 that is stored in the memory 14 and/or the storage 16. It should be understood that the increased high transmission power level X1 and/or the default increased high transmission power level X1 that is increased by the processor 12 may be determined using the method 140 shown in FIG. 5, which may be determined based on the BPS Probability of Detection and False Alarm Rate as described in the method 140. In this manner, the method 170 enables the user equipment 10 to determine and apply transmission power levels based on the BPS 23 Probability of Detection and a presence of a human target as detected by the BPS 23, while ensuring compliance with regulatory RF exposure limits.

Figure 8:
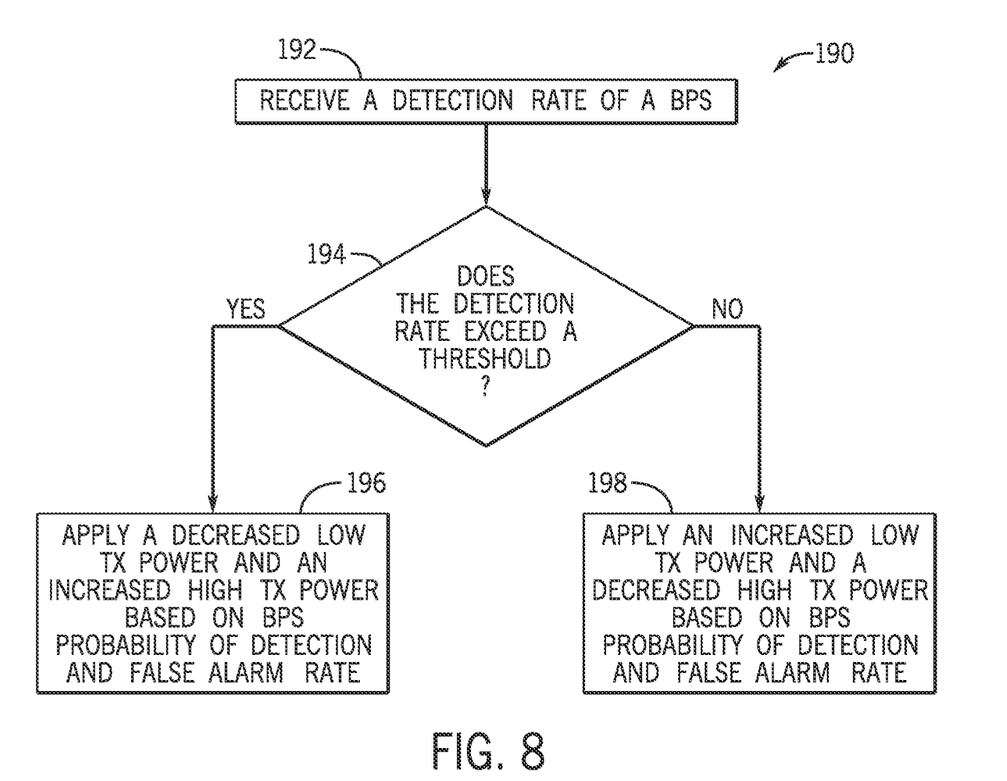
FIG. 8 is a flowchart of a method for determining and applying transmission power levels based on the Probability of Detection (Pa) and frequency of detection of a human target as detected by the body proximity sensor of FIG. 3, while ensuring compliance with regulatory RF exposure limits, according to embodiments of the present disclosure.

Moreover, in some embodiments, the processor 12 may store multiple pairs of high and low transmission power levels (X1, X2) in the memory 14 and/or the storage 16 to be selected and used based on, for example, a frequency or rate that a human target is detected by the BPS 23. FIG. 8 is a flowchart of a method 190 for determining and applying transmission power levels based on the Probability of Detection (Pa) and frequency of detection of a human target as detected by the BPS 23, while ensuring compliance with regulatory RF exposure limits, according to embodiments of the present disclosure. Any suitable device (e.g., a controller) that may control components of the user equipment 10, such as the processor 12, may perform the method 190. In some embodiments, the method 190 may be implemented by executing instructions stored in a tangible, non-transitory, computer-readable medium, such as the memory 14 or storage 16, using the processor 12. For example, the method 190 may be performed at least in part by one or more software components, such as an operating system of the user equipment 10, one or more software applications of the user equipment 10, and the like. While the method 190 is described using steps in a specific sequence, it should be understood that the present disclosure contemplates that the described steps may be performed in different sequences than the sequence illustrated, and certain described steps may be skipped or not performed altogether.

In process block 192, the processor 12 receives a detection rate or frequency of a human target by the BPS 23. In particular, the BPS 23 may detect a human target over at least a portion of a time window (e.g., 1 second or less, 4 seconds or less, 10 seconds or less, 30 seconds or less, and so on), and the processor 12 may determine a rate of the detection over the time window (e.g., between 0 to 100% of the time window). In decision block 194, the processor 12 determines whether the detection rate exceeds a threshold. That is, the processor 12 may determine whether the detection rate indicates that a human target is more frequently detected. The threshold detection rate may include 30% or greater, 50% or greater, 70% or greater, or any other suitable detection rate that indicates that the human target is more frequently detected.

If so, then, in process block 196, the processor 12 applies a decreased low transmission power level X2 (e.g., beyond what is determined in process block 144 of FIG. 5) and an increased high transmission power level X1 (e.g., beyond what is determined in process block 144 of FIG. 5). That is, because there is a human target detected that may be more frequently exposed to RF signals emitted by the antenna 55, the processor 12 may apply the decreased low transmission power level X2 to ensure that the regulatory RF exposure limits are met and/or not exceeded. Moreover, because the decreased low transmission power level X2 may drive down the average transmission power of the transmitter 52, the processor 12 may apply the increased high transmission power level X1 to compensate. Advantageously, a human target may not be exposed to the increased high transmission power level X1, as it may be implemented when the BPS 23 detects that there is no human target.

The decreased low transmission power level X2 and the increased high transmission power level X1 may be stored in the memory 14 and/or the storage 16, or the processor 12 may decrease the low transmission power level X2 and increase the high transmission power level X1 that are stored in the memory 14 and/or the storage 16. It should be understood that the decreased low transmission power level X2 and/or the low transmission power level X2 that is decreased by the processor 12, and the increased high transmission power level X1 and/or the high transmission power level X1 that is increased by the processor 12 may be determined using the method 140 shown in FIG. 5, which may be determined based on the BPS Probability of Detection and False Alarm Rate as described in the method 140.

If the processor 12 determines that the detection rate does not exceed the threshold, then, in process block 198, the processor 12 applies an increased low transmission power level X2 (e.g., beyond what is determined in process block 144 of FIG. 5) and a decreased high transmission power level X1 (e.g., beyond what is determined in process block 144 of FIG. 5). That is, because there is a human target detected that may be less frequently exposed to RF signals emitted by the antenna 55, the processor 12 may apply the increased low transmission power level X2. Moreover, because the increased low transmission power level X2 may drive up the average transmission power of the transmitter 52, the processor 12 may apply the decreased high transmission power level X1 to compensate.

The increased low transmission power level X2 and the decreased high transmission power level X1 may be stored in the memory 14 and/or the storage 16, or the processor 12 may increase the low transmission power level X2 and decrease the high transmission power level X1 that are stored in the memory 14 and/or the storage 16. It should be understood that the increased low transmission power level X2 and/or the low transmission power level X2 that is increased by the processor 12, and the decreased high transmission power level X1 and/or the high transmission power level X1 that is decreased by the processor 12 may be determined using the method 140 shown in FIG. 5, which may be determined based on the BPS Probability of Detection and False Alarm Rate as described in the method 140. In this manner, the method 170 enables the user equipment 10 to determine and apply transmission power levels based on the BPS 23 Probability of Detection and frequency of detection of a human target as detected by the BPS 23, while ensuring compliance with regulatory RF exposure limits.

In some embodiments, there may be a default or medium pair of high and low transmission power levels (X1, X2) (e.g., where the default low transmission power level is between the decreased and increased low transmission power levels, and the high transmission power level is between the decreased and increased high transmission power levels) that may be stored, selected, and/or applied by the processor 12 when the detection rate of a human target within a threshold proximity to the antenna 55 is between a lower threshold percentage of time (e.g., 20% or less, 30% or less, 40% or less, and so on) and a higher threshold percentage of time (e.g., 60% or more, 70% or more, 80% or more, and so on).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. One or more non-transitory, tangible, computer-readable media, storing instructions that cause processing circuitry to:
   receive a probability of detection of a body by a body proximity sensor;
   determine a false alarm rate of the body proximity sensor;
   receive a first transmission power level based on a radio frequency exposure limit;
   determine a second transmission power level based on the first transmission power level and the probability of detection of the body by the body proximity sensor, the second transmission power level being greater than the first transmission power level;
   cause a transmitter to transmit at the first transmission power level based on the false alarm rate and receiving an indication that the body was detected by the body proximity sensor; and
   cause the transmitter to transmit at the second transmission power level based on the false alarm rate and not receiving the indication that the body was detected by the body proximity sensor.

2. The one or more non-transitory, tangible, computer-readable media of claim 1, wherein the instructions cause the processing circuitry to determine the false alarm rate of the body proximity sensor based on a number of incorrect detection attempts and a number of overall detection attempts.

3. The one or more non-transitory, tangible, computer-readable media of claim 1, wherein the instructions cause the processing circuitry to determine a transmission power gain based on the first transmission power level, the second transmission power level, and the false alarm rate.

4. The one or more non-transitory, tangible, computer-readable media of claim 3, wherein the instructions cause the processing circuitry to store the first transmission power level and the second transmission power level based on the transmission power gain.

5. The one or more non-transitory, tangible, computer-readable media of claim 1, wherein the instructions cause the processing circuitry to determine probability of detection of the body by the body proximity sensor based on a number of correct detection attempts and a number of overall detection attempts.

6. The one or more non-transitory, tangible, computer-readable media of claim 1, wherein the instructions cause the processing circuitry to:
   receive a frequency of detection of the body by the body proximity sensor; and cause the transmitter to transmit at a third transmission power level, the third transmission power level being less than the first transmission power level, or a fourth transmission power level, the fourth transmission power level being greater than the second transmission power level based on the detection rate exceeding a threshold range of frequency of detection.

7. A method, comprising:
receiving, at processing circuitry, a probability of detection of a body by a body proximity sensor;
determining, at the processing circuitry, a false alarm rate of the body proximity sensor;
receiving, at the processing circuitry, a first transmission power level based on a radio frequency exposure limit;
determining, at the processing circuitry, a second transmission power level based on the first transmission power level and the probability of detection of the body by the body proximity sensor, the second transmission power level being greater than the first transmission power level; and
applying, at a transmitter, the second transmission power level based on the false alarm rate and not receiving an indication that the body was detected by the body proximity sensor.

8. The method of claim 7, comprising;
determining, at the processing circuitry, a difference between the first transmission power level and the second transmission power level based on the probability of detection of the body by the body proximity sensor, and
storing, in a memory or a storage device, the first transmission power level and the second transmission power level based on the difference.

9. The method of claim 8, wherein storing, in the memory or the storage device, the first transmission power level and the second transmission power level is based on the false alarm rate.

10. The method of claim 9, comprising determining, at the processing circuitry, a transmission power gain based on the difference between the first transmission power level and the second transmission power level and the false alarm rate of the body by the body proximity sensor, wherein storing, in the memory or the storage device, the first transmission power level and the second transmission power level is based on the transmission power gain.

11. The method of claim 7, comprising applying, at the transmitter, the first transmission power level based on the body proximity sensor detecting the body.

12. The method of claim 7, wherein the first transmission power level comprises the radio frequency exposure limit.

13. The method of claim 7, wherein the first transmission power level comprises a sum of the radio frequency exposure limit and an exposure buffer.

14. User equipment, comprising:
a body proximity sensor configured to detect a body with a probability of detection;
one or more antennas;
a transmitter configured to transmit radio frequency signals via the one or more antennas at a first transmission power level or a second transmission power level; and
processing circuitry configured to:
determine a false alarm rate of the body proximity sensor;
cause the transmitter to transmit at the first transmission power level based on the probability of detection, the false alarm rate, and receiving an indication that the body was detected by the body proximity sensor; and
cause the transmitter to transmit at the second transmission power level based on the probability of detection, the false alarm rate, and not receiving the indication that the body was detected by the body proximity sensor, the second transmission power level being greater than the first transmission power level.

15. The user equipment of claim 14, wherein the processing circuitry is configured to select a first stored transmission power level and a second stored transmission power level from a plurality of pairs of stored transmission power levels based on a desired transmission power gain.

16. The user equipment of claim 15, wherein the processing circuitry is configured to adjust the first stored transmission power level and the second stored transmission power level to generate the first transmission power level and the second transmission power level based on the body proximity sensor detecting the body.

17. The user equipment of claim 14, wherein the processing circuitry is configured to determine a frequency of detection of the body by the body proximity sensor, and apply the first transmission power level and the second transmission power level from a plurality of pairs of first transmission power levels and second transmission power levels based on the frequency of detection of the body by the body proximity sensor.

18. The user equipment of claim 17, wherein the processing circuitry is configured to select the first transmission power level and the second transmission power level from the plurality of pairs of first transmission power levels and second transmission power levels based on the frequency of detection of the body by the body proximity sensor being within a threshold range of frequency of detection.

* * * * *